United States Patent
Johnson et al.

(10) Patent No.: US 10,647,305 B2
(45) Date of Patent: May 12, 2020

(54) ACTIVE CANCELLATION OF BRAKE TORQUE VARIATION

(71) Applicant: FORD GLOBAL TECHNOLOGIES, LLC, Dearborn, MI (US)

(72) Inventors: Bradley J. Johnson, Ann Arbor, MI (US); Dale Scott Crombez, Livonia, MI (US); John P. Joyce, West Bloomfield, MI (US); Eric M. Gamberg, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 422 days.

(21) Appl. No.: 14/631,490

(22) Filed: Feb. 25, 2015

(65) Prior Publication Data
US 2016/0245351 A1    Aug. 25, 2016

(51) Int. Cl.
*B60T 8/17* (2006.01)
*B60T 8/173* (2006.01)

(52) U.S. Cl.
CPC ............... *B60T 8/17* (2013.01); *B60T 8/173* (2013.01)

(58) Field of Classification Search
CPC .................................. B60T 8/17; B60T 8/173
See application file for complete search history.

(56) References Cited

U.S. PATENT DOCUMENTS

| | | | | |
|---|---|---|---|---|
| 4,938,541 A | * | 7/1990 | Shaw | B60T 8/34 188/358 |
| 2005/0127745 A1 | * | 6/2005 | Cannata | B60T 1/093 303/11 |
| 2009/0055065 A1 | * | 2/2009 | Dessouki | B60T 8/00 701/70 |
| 2009/0125186 A1 | * | 5/2009 | Recker | B62D 5/0472 701/41 |
| 2012/0285777 A1 | * | 11/2012 | Oshio | B60T 8/00 188/72.1 |
| 2013/0257142 A1 | * | 10/2013 | Kim | B60T 8/17 303/139 |

FOREIGN PATENT DOCUMENTS

| | | | |
|---|---|---|---|
| JP | 2000085554 A | * | 3/2000 |
| JP | 2000344072 A | * | 12/2000 |
| KR | 20020051719 A | * | 6/2002 |

OTHER PUBLICATIONS

Notification of First Office Action in CN Application No. 2019032901997130, dated Apr. 3, 2019.

* cited by examiner

*Primary Examiner* — Charles J Han
(74) *Attorney, Agent, or Firm* — Burr & Forman, LLP (57) ABSTRACT

Systems and methods for cancelling brake torque variation in a motor vehicle are disclosed. Signals indicative of brake torque variation are received at a controller. Based on the signals, a frequency associated with the indicated brake torque variation is determined. At least one of an output time and output volume of pressurized brake fluid is adjusted based on the frequency to cancel the indicated brake torque variation.

20 Claims, 4 Drawing Sheets

ACTIVE CANCELLATION OF BRAKE TORQUE VARIATION

TECHNICAL FIELD

The present disclosure relates generally to cancellation of brake torque variation caused by vibrations in vehicle brake system components, due to for example, brake system components that are warped or scored. More specifically, the present disclosure relates to systems and methods for actively canceling brake judder or roughness in automotive brake systems.

BACKGROUND

Motor vehicle brake systems inhibit rotation of the wheels of the vehicle to decelerate and stop the vehicles. Vehicle brake systems typically include a hydraulic brake system having disc brakes and/or drum brakes. The disc brakes include a brake pad that engages a rotor interconnected to the tire of the vehicle to decelerate the vehicle. The drum brakes include brake shoes that engage a drum interconnected to the tire of the vehicle to decelerate the vehicle.

Under light braking pressures (i.e., used to control the speed of the vehicle), brake pads may, however, only make partial contact or apply uneven force to the rotor surfaces due to circumferential variation in the disc thickness of the disc brake rotor. Circumferential variation in the disc thickness occurs as the disc brake rotor wears, leading to unstable frictional forces between the rotor and the brake pads. This unstable behavior of the disc brake rotor/brake pad friction pair may produce high dynamic contact force, which can, for example, excite strong vibration of the brake pads and generate a corresponding variation in the torque output of the disc brake system. Similarly, brake shoes may unevenly contact the brake drum due to the shape of the drum (e.g., less cylindrical).

Brake judder or brake torque variation "BTV" in vehicles having a hydraulic brake system is due to a chain of events, at the beginning of which there is unequal wear of the brake disks which leads to thickness variation of the brake disk (disc thickness variation (DTV)) or insufficient cylindricity of the drum in drum brakes. The forces created by the brake torque variation are transmitted to the tire of the vehicle and cause the tires of the vehicle to vibrate in the longitudinal direction of the tire. This vibration is thereafter transmitted to the brake system and chassis of the vehicle and results in brake roughness. Brake roughness is defined as the unexpected vibration that the driver of the vehicle feels through the steering wheel, brake pedal and seat track. The vibration associated with brake roughness can be transmitted to the driver of the vehicle, causing the driver to feel the vibrations.

In order to prevent strong vibration of the brake system, coupled brake actuation systems (i.e., brake actuation systems that are directly connected to a brake pedal of the motor vehicle) regulate the response time and pressure control of the brake pads as they are moved towards one another and into contact with the two friction surfaces to suppress rotor resonant vibration. For example, in a coupled brake actuation system, a pushrod controlled by the brake pedal may regulate the flow of hydraulic fluid from a brake line to the brake pads by exerting force on a piston of a master cylinder that pushes the hydraulic fluid from a reservoir to a pressure chamber. This increases the pressure of the coupled brake actuation system and forces hydraulic fluid through the brake lines and towards caliper pistons that act on the set of calipers and, consequently, cause the brake pads to apply force to the disc brake rotor. Increases and decreases in the pressure of the hydraulic fluid being passed through the calipers causes the brake pedal to feel extremely hard or soft to a driver of the motor vehicle.

It may, therefore, be advantageous to provide a disc brake system configured as a de-coupled electro-mechanical brake actuation system that regulates the pressure control and response time of the brake pads (independent from the brake pedal) to suppress vibration caused by circumferential variation in the disc thickness of the disc brake rotor or by variation in the cylindicity of the drum.

SUMMARY

In accordance with various exemplary embodiments, systems and methods for cancelling brake torque variation in a motor vehicle are described. In accordance with one aspect of the present disclosure, a method for cancelling brake torque variation in a motor vehicle includes receiving signals indicative of brake torque variation at a controller. Based on the signals, determining a frequency associated with the indicated brake torque variation. At least one of an output time and output volume of pressurized brake fluid is adjusted based on the frequency to cancel the indicated brake torque variation.

In accordance with another aspect of the present disclosure, a system for cancelling brake torque variation in a motor vehicle is provided. The system comprises a controller configured to receive signals indicative of brake torque variation. The controller is configured to determine a frequency and phase associated with the indicated brake torque variation based on the signals. The controller is configured to adjust at least one of an output time and output volume of pressurized brake fluid based on the frequency and phase to cancel the indicated brake torque variation.

In accordance with a further aspect of the present disclosure, a method for cancelling brake torque variation in a brake system of a motor vehicle is provided. The method comprises receiving, at a controller, signals indicative of brake torque variation. A frequency associated with the indicated brake torque variation is determined based on the signals. A variation in a clamping force that applies brake pads to a rotor of the brake system is reduced based on the frequency.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are shown in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates cancellation of brake torque variation in vehicle brake systems. Brake torque variation (BTV) occurs due to circumferential variation in the thickness of the disc brake rotor (disc thickness variation (DTV)) in disc brake systems or due to insufficient cylindricity of the drum in drum brakes. This disk thickness variation produces a harmonic modulation of the braking force during braking. The oscillations of the braking force in turn excite different modes of the wheel suspension, and the vibrations may be felt by the driver in the vehicle chassis, or may be transmitted to the driver via other vehicle components such as the steering system. Although discussed below with regard to disc brake systems, those of ordinary skill in the art will understand that the concepts described herein are equally applicable to drum brake systems.

The exemplary embodiments described herein utilize signal processing techniques similar to those for active nibble cancellation to determine the phase and frequency of brake judder or roughness in the vehicle disc brake rotors. Active nibble cancellation techniques utilize a tuned resonator filter to reduce or eliminate the development of steering nibble due to BTV via an electronic power assist steering (EPAS) system to eliminate vibration in the steering system. The present disclosure is directed to eliminate BTV where it occurs—at the rotor—rather than downstream in the steering system. In other various exemplary embodiments described herein, for example, isolated or de-coupled brake actuation systems are contemplated for regulating the pressure control and response time of the brake pads to suppress the detected resonant vibration of the disc brake rotors.

In particular, in at least some exemplary embodiments, it is possible to determine the frequency of rotation of the disc brake rotor and to determine when the variation in thickness are passing through the calipers (e.g., when a relatively thin or thick portion of the rotor is passing through the caliper) and to compensate for variations in the thickness as the rotor rotates by correspondingly modulating, for example, a volume and/or pressure of brake fluid applied to the disc brake rotors through calipers at the same frequency as a detected resonant vibration during braking events. Thus, the present disclosure contemplates applying a counteracting pressure variation at the caliper of the brake system to cancel out BTV due to brake rotor disc thickness variation.

Furthermore, due to its de-coupled structure (e.g., a brake actuation system that isolates the brake pedal), brake actuation systems in accordance with the present disclosure are able to mitigate brake torque variation by compensating the hydraulic fluid moving in and out of the calipers when circumferential wear of the disc brake rotor is detected without noticeable change in the feel of the pedal of the vehicle to an operator. In particular, hydraulic fluid pressure may be modulated at the same frequency the wheels rotate by releasing fluid from a caliper at "high" spots on the rotor and adding fluid to a caliper at "low" spots on the rotor. In accordance with one aspect of the present disclosure, pressure may be measured over sample periods, for example, at 10 millisecond (ms) time intervals. For hydraulically actuated calipers, in accordance with the present teachings, BTV compensation is based on the ability to release fluid from and add fluid to the calipers during braking. In particular, during braking, brake pads generally stay in contact with the rotor, but the clamping force holding the pads in contact with the rotors varies, causing the brake torque variation. By manipulating fluid volume at the caliper, it is possible to reduce the variation of the clamping force caused by disc thickness variation, and thus, reduce or cancel the brake torque variation.

Figure 1:
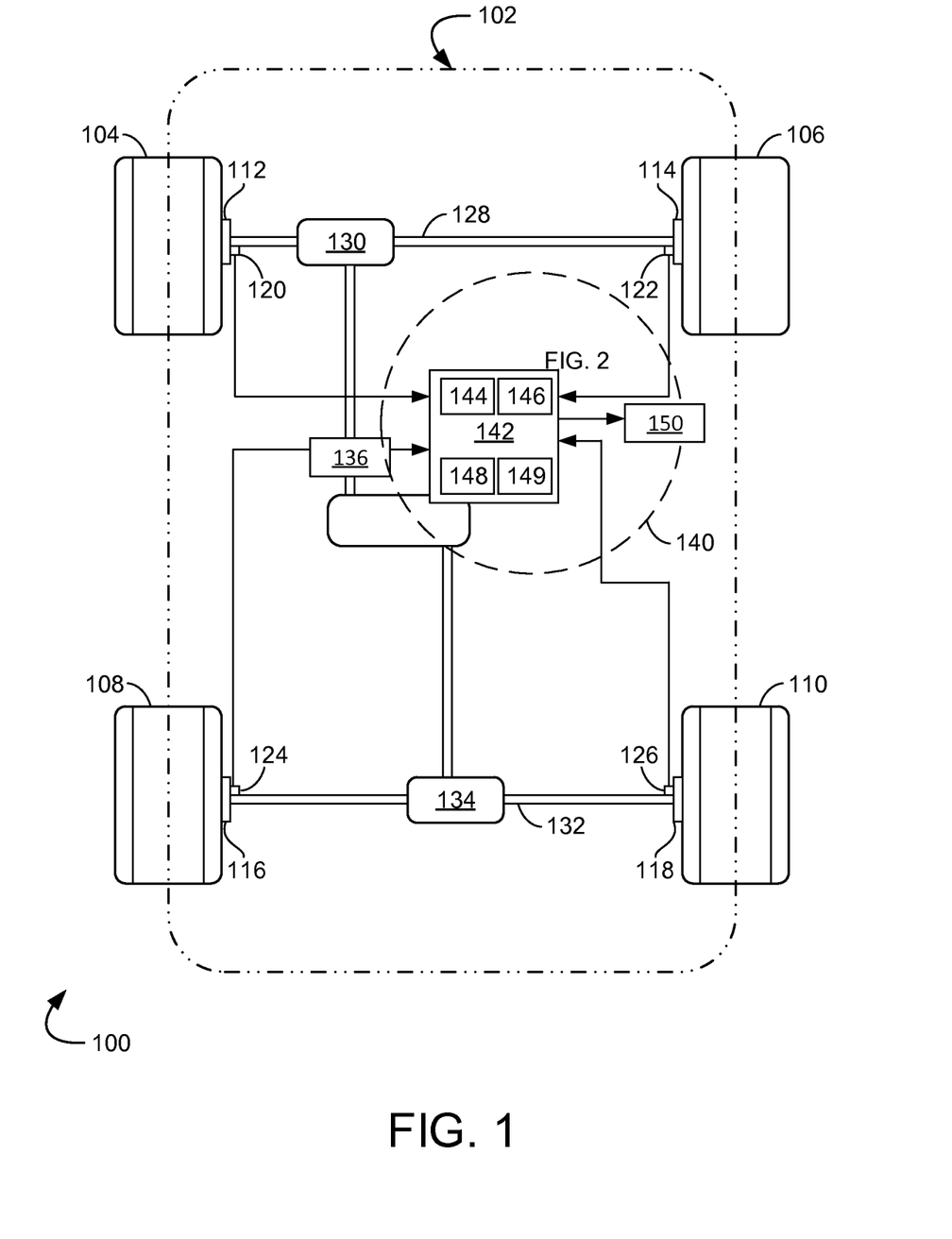
FIG. 1 is a schematic diagram illustrating some structural elements of an exemplary vehicle having an electro-hydraulic braking system for regulating the pressure control and response time of brake pads in accordance with the present disclosure.

FIG. 1 is a schematic diagram illustrating some structural elements of an exemplary embodiment of an electro-hydraulic braking system 100 for regulating the pressure control and response time of brake pads in accordance with the present disclosure. As shown in FIG. 1, a vehicle 102 may have a pair of front wheels 104, 106 coupled together by an axle 128 and a differential 130. Front wheels 104, 106 may be equipped with respective front brake assemblies 112, 114 that include various sensors (not shown). Front wheel 104 and front brake assembly 112 are mounted on the left side (LF) of the front axle 128. Front wheel 106 and front brake assembly 114 are mounted on the right side (RF) of the front axle 128. Similarly, the vehicle 102 may have a pair of rear wheels 108, 110 that may be coupled together by an axle 132 and a rear differential 134. The rear wheels 108, 110 may be equipped with respective rear brake assemblies 116, 118. Rear wheel 108 and rear brake assembly 116 are mounted on the left side (LR) of rear axle 132. Rear wheel 110 and rear brake assembly 118 are mounted on the right side (RR) of rear axle 132.

Figure 2A:
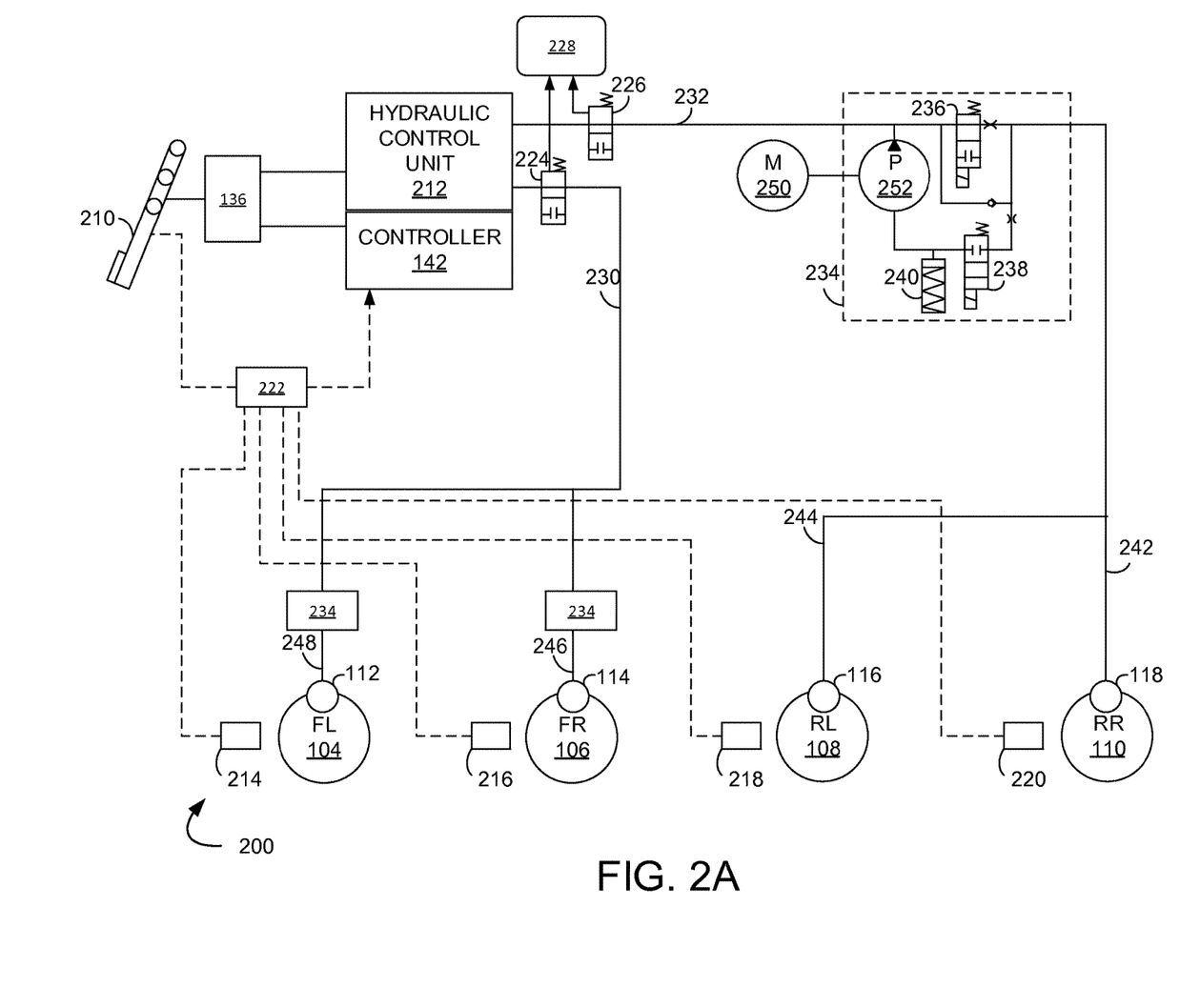
FIGS. 2A, 2B, and 2C are schematic diagrams illustrating a portion of the exemplary electro-hydraulic braking system of FIG. 1.

In an exemplary embodiment, the vehicle 102 may have an anti-lock brake system (ABS) 140, discussed in further detail in FIG. 2A, that includes an operator-manipulated brake pedal coupled to a master cylinder 136, and at least one controller 142 that comprises control modulators 144, 146, 148, 149 associated with respective front and rear brake assemblies 112, 114, 116, 118. The control modulators 144, 146, 148, 149 release and re-apply hydraulic brake fluid pressure to calipers of the front and rear brake assemblies 112, 114, 116, 118. The controller 142 is configured to receive signals from sensors (not shown) located at the wheels 104, 106, 108, 110 and brake assemblies 112, 114, 116, 118 and uses the received signals to monitor brake torque variation of the vehicle 102. For example, when brake torque variation is detected, the controller 142 determines the frequency of the variation and, based on the frequency, compensates for the variation using pressure control and response time of the hydraulic fluid as it is moved in and out of calipers (not shown) of the respective brake assemblies 112, 114, 116, 118 in order to mitigate the effects of circumferential wear of the disc brake rotors (not shown) on the vehicle 102.

In another exemplary embodiment, the system 100 may further include a notification system 150. The notification system 150 may be configured to receive a signals from the controller 142 and to indicate, for example, to an operator of the vehicle 102 that the disc brake rotors (not shown) have circumferential wear that is causing brake torque variation and that the vehicle (brake system) should be serviced. This type of notification may be made, for example, when the system 100 cannot mitigate the brake torque variation by applying more or less hydraulic fluid to the calipers (not shown).

Figure 2B:
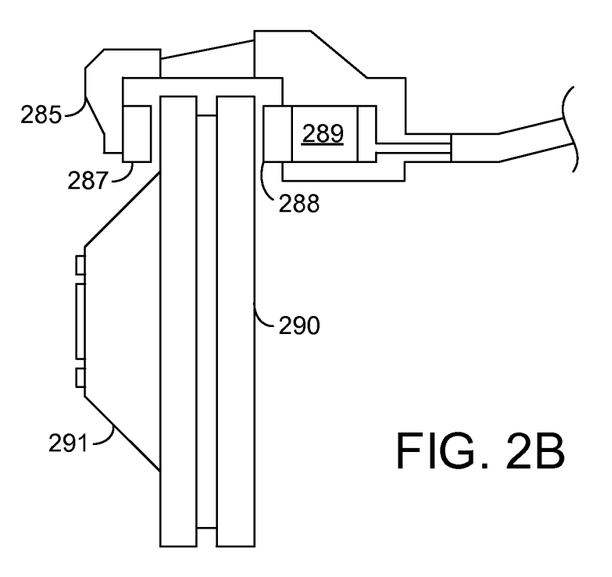

FIGS. 2A and 2B are schematic diagrams illustrating a portion of the exemplary electro-hydraulic braking system of FIG. 1. The portion of the exemplary electro-hydraulic braking system shown in FIGS. 2A and 2B can be implemented in the vehicle 102 shown in FIG. 1. In addition, although FIGS. 2A and 2B depict an exemplary portion of an electro-hydraulic braking system for regulating pressure control and response time for application of brake pads, one skilled in the art, using the disclosures provided herein, will appreciate that various elements of the system can be omitted, rearranged, combined, and/or adapted in various ways.

Referring to FIGS. 1, 2A, 2B, and 2C the vehicle 102 may have an ABS 140 that includes an operator-manipulated brake pedal 210 coupled to the master cylinder 136, at least one controller 142 that may include an ECM (not shown), and a hydraulic control unit 212 that is configured to release and re-apply hydraulic brake fluid pressure to calipers 285, shown in FIG. 2B, of the front and rear brake assemblies 112, 114, 116, 118 shown in FIG. 1. In an exemplary embodiment, the controller 142 may be linked to wheel speed sensors 214, 216, 218, 220 that form a part of respective brake assemblies 112, 114, 116, 118 of the wheels 104, 106, 108, 110 of the vehicle 102 and brake pedal sensor 222, which is associated with brake pedal 210. The brake assemblies 112, 114, 116, 118 are operatively connected to brake pedal 210, and may include, for example, a biasing element (not shown) and brake pedal valves 224, 226. The brake pedal valves 224, 226 may be, for example, proportional control valves that are configured by the hydraulic control unit 212 to proportion a flow of fluid from the master cylinder 136 to the front and rear brake assemblies 112, 114, 116, 118. The brake pedal valves 224, 226 include a valve inlet, valve outlet, and a valve dump outlet which is in communication with a return reservoir 228. In an exemplary embodiment, when the brake pedal 210 is depressed, brake pedal sensor 222 transmits signals to the controller 142, the signals indicative of the force applied to the brake pedal 210 by the vehicle operator. For example, in operation, the hydraulic control unit 212 may proportion the hydraulic fluid from the master cylinder 136 between front and rear brake assemblies 112, 114, 116, 118 using brake pedal valves 224, 226 and an accumulator (not shown) in a conventional manner to control contact of brake pads 287, 288, shown in FIG. 2B, with rotor surfaces.

In another exemplary embodiment, the controller 142 may determine a volume of pressurized hydraulic fluid in the master cylinder 136 or accumulator (not shown) to release or re-apply to the calipers 285 of the disc brake rotors 290 of the brake assemblies 112, 114, 116, 118 based on the detected brake judder and/or brake torque variation in the vehicle 102. The volume of pressurized hydraulic fluid to be proportioned by the hydraulic control unit 212 between the front and rear brake assemblies 112, 114, 116, 118 is proportioned by, for example, adjusting an amplitude of modulation of the vehicle 102, the rotational frequency of the wheels 104, 106, 108, 110, and the phase of the modulation of the pressurized fluid being released or re-applied to the calipers 285 of the brake assemblies 112, 114, 116, 118 to cancel detected brake judder and/or brake torque variation.

In an ABS system 140, the brake pedal 210 is mechanically coupled to the master cylinder 136 and the master cylinder 136 produces hydraulic pressure in proportion to the force applied to the brake pedal 210 by an operator. The hydraulic control unit 212 constantly releases and re-applies the pressurized hydraulic fluid to the calipers 285 via brake pedal valves 224, 226, after a delay interval, to compensate for detected brake judder and/or brake torque variation. The delay interval may be a scheduled function of vehicle deceleration. The coupled state of the ABS system causes the operator of the vehicle 102 to feel increases and decreases in stiffness or pulsation of the brake pedal 210. This occurs as the volume of pressurized hydraulic fluid from the master cylinder 136 to calipers 285 of brake assemblies 112, 114, 116, 118 through brake pedal valves 224, 226, and an accumulator increases or decreases to cancel detected brake judder and/or brake torque variation.

For example, under light braking pressures (i.e., used to control the speed of the vehicle), brake pads 287, 288 may only make partial contact or apply uneven force to rotor surfaces due to circumferential variation in the disc thickness of the disc brake rotor 290, shown in FIG. 2B. Circumferential variation in the disc thickness occurs as the disc brake rotor 290 wears, leading to unstable frictional forces between the rotor 290 and the brake pads 287, 288. This unstable behavior of the disc brake rotor 290/brake pad 287, 288 friction pair may produce high dynamic contract force, which can, for example, excite strong vibration of the brake pads 287, 288 and generate a corresponding variation in the torque output of the disc brake system (i.e., brake torque variation or brake judder). In these circumstances, the controller 142 detects brake torque variation using sensors (not shown) and diagnostic signals received from the brake assemblies 112, 114, 116, 118 and regulates the flow of pressurized hydraulic fluid to the brake assemblies 112, 114, 116, 118 via the hydraulic control unit 212.

In a de-coupled system, the amount of pressurized hydraulic fluid being released or re-applied to the calipers 285 of brake assemblies 112, 114, 116, 118 is controlled by a motor 250 driven pump 252. For example, in an exemplary embodiment, to cancel brake judder and/or brake torque variation detected by sensors (not shown), the controller 142 may bypass the hydraulic control unit 212 and transmit a signal directly to solenoid of a normally closed directional control valve, for example, brake valve 236. The solenoid (not shown) of brake valve 236 shifts the position of the brake valve 236 from a closed position to an open position. Brake valve 236 communicates the pressurized hydraulic fluid via hydraulic fluid lines 230, 232 and/or hydraulic fluid lines 242, 244, 246, 248 to pressure control valve 238. The solenoid (not shown) of pressure control valve 238 shifts the position of the pressure control valve 238 from a closed position to an open position so that the pressurized hydraulic fluid may flow to hydraulic accumulator 240. Hydraulic accumulator 240 is controlled by controller 142 and the motor 250 driven pump 252. The motor 250 driven pump 252 regulates the flow of pressurized hydraulic fluid in and out of the accumulator 240 and through hydraulic fluid lines 242, 244, 246, 248 to calipers 285 using pressure control valve 238 and brake valve 236. The motor 250 driven pump 252 is isolated from the master cylinder 136 and regulates the flow of pressurized hydraulic fluid to brake assemblies 112, 114, 116, 118 based on the signals transmitted by controller 142.

For example, in an exemplary embodiment, brake valve 236 and pressure control valve 238 are normally closed, solenoid controlled valves that have outlet passages that are connected with an inlet of pump 252. The controller 142 energizes the motor 250 and controls the output volume of the pump 252. When pressure control valve 238 is in an open position, pressurized hydraulic fluid may be pumped or removed from the accumulator 240 and electro-hydraulic braking system 200 by the motor 250. The controller 142 may instruct the pump 252 via the motor 250 to increase or decrease the volume of pressurized hydraulic fluid flowing to the calipers 285 and brake pads 287, 288 of the brake assemblies 112, 114, 116, 118 when brake judder and/or brake torque variation is detected. Since the brake pedal 210 is de-coupled from the electro-hydraulic braking system 200, an increase or decrease in the volume of pressurized fluid flowing to the calipers 285 of the brake assemblies 112, 114, 116, 118 to cancel detected brake judder and/or brake torque variation is not felt by the operator of the vehicle 102.

In another exemplary embodiment, not illustrated, the accumulators 240 of the de-coupled system are replaced with linear hydraulic pistons commonly used in an ABS system. The controller 142 may energize the motor 250 and control the output volume of the pump 252. When pressure control valve 238 is in an open position, pressurized hydraulic fluid may be pumped or removed from the linear hydraulic pistons (not shown) and electro-hydraulic braking system 200 by the motor 250 (e.g., an electric brake boost system). The controller 142 may instruct the pump 252 via the motor to increase or decrease the volume of pressurized hydraulic fluid flowing to the calipers 285 and brake pads 287, 288 of the brake assemblies 112, 114, 116, 118 when brake judder and/or brake torque variation is detected. Since the brake pedal is de-coupled from the electro-hydraulic braking system 200, an increase or decrease in the volume of pressurized fluid flowing to the calipers 285 of the brake assemblies 112, 114, 116, 118 to cancel detected brake judder and/or brake torque variation is not felt by the operator of the vehicle 102.

In another exemplary embodiment, the controller 142 may be in communication with shuttle valves (not shown) and the pressurized hydraulic fluid lines 230, 232 may be coupled to slack adjusters (not shown). The flow of pressurized fluid through brake lines 230, 232 may be divided between additional brake fluid lines, for example, brake fluid lines 242, 244, 246, 248, that deliver the pressurized hydraulic fluid to front and rear brake assemblies 112, 114, 116, 118.

Figure 2C:
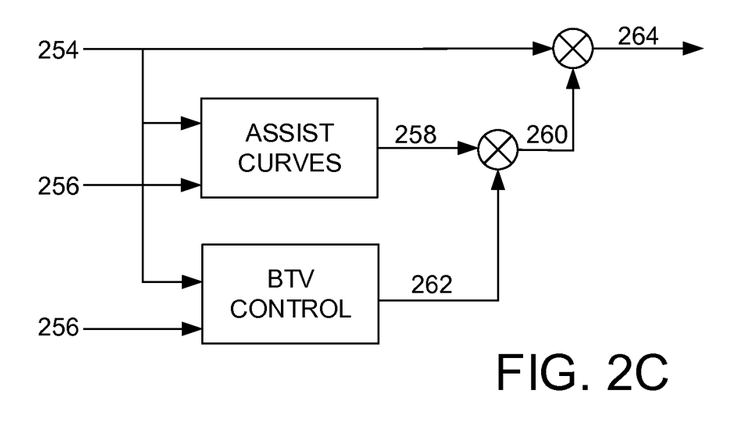

In another exemplary embodiment, as shown in FIG. 2C, the controller 142 determines the frequency of the brake judder and/or brake torque variation by obtaining a caliper pressure, master cylinder pressure, brake pedal travel, or acceleration input(s) 254 from sensors (not shown) associated with the brake pedal 210 and brake assemblies 112, 114, 116, 118 and wheel speed or vehicle speed inputs 256 associated with the wheels 104, 106, 108, 110 of the vehicle 102. Based on these inputs 254, 256, the controller 142 detects BTV and uses a tuned resonator software filter 258 to generate the BTV signal. The tuned resonator software filter 258 is dynamically adapted using the front wheel speed inputs 256 and brake torque variation control 266 is applied. For example, the motor 250, shown in FIG. 2A, is used to actively cancel BT by applying a 180 degree out-of-phase cancelling torque 260 to the BTV. The controller 142 calculates a fluid volume change or brake pressure change output 262 to cancel BTV to a level undetectable by the operator 264.

In an ABS system, the controller 142 instructs the master cylinder 136 via the hydraulic control unit 212 to increase or decrease the volume of pressurized hydraulic fluid flowing to the calipers 285 and brake pads 287, 288 of the brake assemblies 112, 114, 116, 118 based on the calculated fluid volume change and/or brake pressure change output. In a de-coupled system, the controller 142 instructs the pump 252 via the motor 250 to increase or decrease the volume of pressurized hydraulic fluid flowing to the calipers 285 and brake pads 287, 288 of the brake assemblies 112, 114, 116, 118 based on the calculated fluid volume change and/or brake pressure change output.

One of ordinary skill in the art will understand that the calipers 285, shown in FIG. 2B, of the brake assemblies 112, 114, 116, 118 include a caliper 285 and an anchor bracket that are configured to mount a brake pad 287, 288 to the caliper 285. Two brake pads 287, 288 may be contained within the caliper 285 (i.e., which is positioned over a cheek portion of a rotor of the disc brake rotors 290 of the brake assemblies 112, 114, 116, 118) with their friction surfaces facing the rotor 290. In this manner, when the brakes are applied, the caliper 285 clamps or squeezes the two pads 287, 288 together onto the spinning rotor 290 to slow and/or stop the vehicle. Circumferential wear on the disc brake rotor 290 of the brake assemblies 112, 114, 116, 118 causes the disc brake rotor 290 to have varying thicknesses. Thus, as the disc brake rotor 290 spins around, the calipers 285 attempt to clamp the disc brake rotor 290 with a constant amount of pressure. This leads to a grabbing and releasing of the disc brake rotor 290 as a thick portion of the disc brake rotor 290 moves through the caliper 285 and increased and decreased pressure of the hydraulic fluid, e.g., brake judder and/or brake torque variation. As is known by one of ordinary skill in the art, brake judder and/or brake torque variation manifests itself to an operator of the vehicle 102 as, for example, shaking of the vehicle 102 body and twisting of the steering wheel or column of the vehicle 102.

The caliper 285 assembly also includes at least one cable/fluid line that may be embedded within the caliper 285. In various additional embodiments, a cable/fluid line may be embedded within the anchor bracket. Modulating the pressure of the hydraulic fluid moving into the calipers 285 through the cable/fluid lines of the brake assemblies 112, 114, 116, 118 cancels the brake judder and/or brake torque variation by applying increased pressure when a thin portion of the disc brake rotor 290 moves through the caliper 285 and applying decreased pressure when a thick portion of the disc brake rotor 290 moves through the caliper 285. Caliper assemblies in accordance with the present disclosure may have various configurations, including various configurations of calipers and anchor brackets, without departing from the scope of the present disclosure and claims, and are not bound by any specific designs, geometries, and/or orientations.

Figure 3:
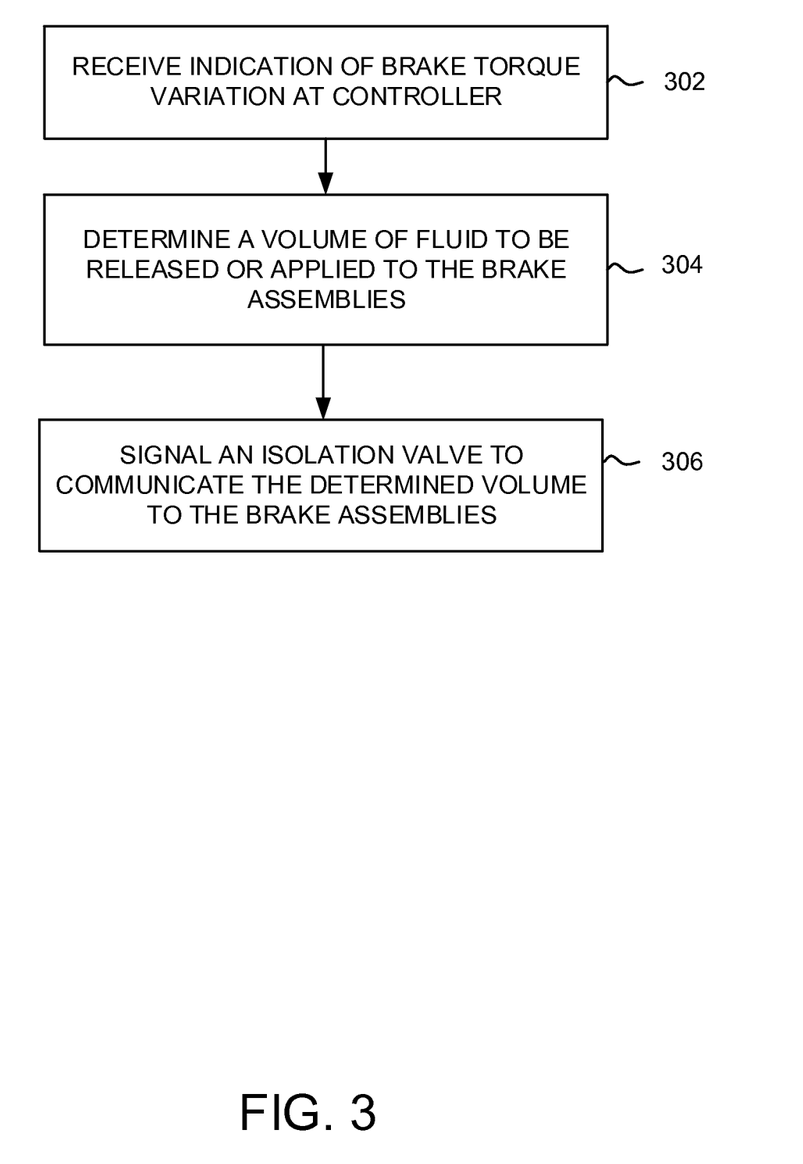
FIG. 3 is an exemplary method of regulating pressure control and response time of brake pads in response to a detected torque brake variation in a vehicle in accordance with the present teachings.

FIG. 3 is an exemplary method for regulating pressure control and response time of brake pads in response to a detected torque brake variation in a vehicle. The method will be discussed with reference to the exemplary vehicle 102 shown in FIG. 1 and the exemplary electro-hydraulic braking system 200 shown in FIGS. 2A and 2B. However, the method can be implemented with any suitable electro-hydraulic braking system in any vehicle. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

Referring to FIG. 3, at step 302, the controller 142 receives signals from brake pedal sensor 222 associated with the brake pedal 210, wheel speed sensors 214, 216, 218, 220, and sensors associated with brake assemblies 112, 114, 116, 118 that indicate brake torque variation due to circumferential wearing on the disc brake rotors 290 of the brake assemblies 112, 114, 116, 118. For example, an operator may apply force to the brake pedal 210 (mechanically coupled to the master cylinder 136) and produce hydraulic pressure in the electro-hydraulic braking system 200. The master cylinder 136 proportions the hydraulic pressure between fluid lines 230, 232 and/or 242, 244, 246, 248 in a conventional manner and sensors (i.e., rotational sensors, pressure sensors, accelerometers, inertial sensors, stability control signals, etc.), not shown, transmit diagnostic information signals to the controller 142. The controller 142 may use the transmitted diagnostic information signals to detect brake judder and/or brake torque variation in the vehicle 102 that is caused by circumferential wear on the disc brake rotors 290 of the brake assemblies 112, 114, 116, 118. In an ABS system, after a delay interval, the controller 142 may instruct the modulators 144, 146, 148, 149, shown in FIG. 1, to repeatedly release and re-apply pressurized hydraulic fluid to the calipers 285 at a particular frequency. In an ABS system, the force applied to the brake pedal 210 (mechanically coupled to the master cylinder 136) produces hydraulic pressure in the master cylinder 136 that is greater than the pressure in the accumulator 240. When the operator releases the brake pedal 201, the hydraulic pressure in the master cylinder 136 drops below the accumulator 240 pressure and the accumulator empties into the master cylinder via a check valve (not shown). In this manner, an operator may feel increases and decreases in hydraulic pressure necessary to counter detected brake judder and/or brake torque variation.

In a de-coupled system, the check valve (not shown) is replaced with a motor 250 driven pump 252 which can empty the accumulator 240 at any time. The controller 142 instructs the motor 250 via a travel sensor (not shown) connected to the brake pedal 210 to control the output volume of the pump 252 to the pressure control valve 238 and calipers 285. The pump 252 cavitates if there is no fluid in the accumulator 240, which automatically regulates the master cylinder 136 fluid volume and brake pedal 210 position. Solenoid valves are added to allow the pump 252 pressure to be maintained at the wheels 104, 106, 108, 118 and brake assemblies 112, 114, 116, 118. Valves on a side of the pump 252 allow the pump to suck fluid from the master cylinder 136 and pressure-relief valves keep the pump 252 from destroying the hydraulic control unit 212. Inlet valves on undriven wheels, for example, wheels 108, 110, remain open and allow an operator to apply the brake pedal 210.

At step 304, the controller 142 determines the volume of pressurized hydraulic fluid to release or re-apply to the calipers 285 of the disc brake rotors 290 of the brake assemblies 112, 114, 116, 118. The controller 142 may be configured to adjust an amplitude of modulation of the vehicle 102, the rotational frequency of the wheels 104, 106, 108, 110, and the phase of the modulation of the pressurized hydraulic fluid being released or re-applied to the calipers 285 of the brake assemblies 112, 114, 116, 118 to cancel detected brake judder and/or brake torque variation. For example, the controller 142 may convert detected wheel speed, detected via wheel speed sensors 214, 216, 218, 220, to a frequency, select a brake torque variation order, determine brake torque variation enable frequencies for brake judder cancellation, and select a volume of pressurized hydraulic fluid to be released or re-applied to the calipers 285 of the brake assemblies 112, 114, 116, 118.

Brake judder and/or brake torque variation most commonly occurs at 1× or 2× the rotational velocities of the wheels 104, 106, 108, 110. Brake judder and/or brake torque variation is most prevalent when the frequencies of the front wheels 104, 106 and brake torque variation align with the suspension resonant frequency of the vehicle 102, typically 10 to 15 Hz. The controller 142 may use a software function that resonates at the frequency of the front wheel 104, 106 speeds. If the speed of the front wheels 104, 106 is not detected, the vehicle 102 speed may be used. The precise tuning of the resonator allows the controller 142 to target a specific frequency of the disc brake rotor without disturbing other vehicle 102 frequencies. In an exemplary embodiment, the controller 142 uses a tuned resonator software filter to detect and identify the magnitude of the disturbance (e.g., brake pressure variation, brake pedal variation, vehicle vibration) symptomatic of BTV caused by thickness variation on the disc brake rotors 290. The algorithm calculates front wheel 104, 106 frequencies, calculates tuned resonator coefficients and BTV signal, and calculates brake torque variation cancelling torque.

To calculate the front wheel 104, 106 frequencies, the algorithm uses wheel speed signals received at the controller 142 from wheel speed sensors 214, 216, 218, 220. The received wheel speed signals may be filtered to reject high frequency noise and compensated for any lags associated with filtering. The resultant filtered speed may be used to calculate the front wheel 104, 106 frequencies by using a wheel 104, 106 conversion factor. The algorithm may implement a tuned resonator software filter applied to the torque signal to produce a BTV signal. The calculated BTV signal is used by the controller 142 to identify the instantaneous brake torque variation torque magnitude, frequency, and phase experienced by an operator. In general, the BTV signal has a 0° phase lag and a gain of 1 at the front wheel 104, 106 frequency.

Brake judder and/or brake torque variation are generally first order or second order phenomenon's. Vibrations occur at a frequency of once or twice the rotational velocities of the front wheels 104, 106. In an exemplary embodiment, the tuned resonator software filter may be implemented to cancel brake judder and/or brake torque variation by dynamically adapting to a factor of the frequency of the front wheel's 104, 106 frequency. The brake judder and/or brake torque variation signal, a second order brake torque variation, occurs at once the frequency of the wheel speed, or twice the frequency of the wheel speed, which happens at half the speed of a first order BTV.

In an exemplary embodiment, brake torque variation cancellation is used to modulate the pressure of the hydraulic fluid moving into the calipers 285 through the cable/fluid lines of the brake assemblies 112, 114, 116, 118 and to cancel the brake judder and/or brake torque variation by applying increased pressure when a thin portion of the disc brake rotor moves through the caliper. Decreased pressure is applied when a thick portion of the disc brake rotor moves through the caliper 285. This may be accomplished by continuously monitoring the vehicle 102 for brake judder and/or brake torque variation caused by circumferential wear on the disc brake rotors 290, and releasing or re-applying pressurized hydraulic fluid to the calipers 285 in phase and at the correct amplitude and frequency of the disc brake rotors 290. The controller 142 may constantly adjust the phase based on the velocity the vehicle 102 is traveling at.

At step 306, the controller 142 detects brake torque variation of the vehicle 102 and signals the pressure control valve 238 to communicate the determined volume of pressurized hydraulic fluid to the calipers 285. For example, in an exemplary embodiment, when circumferential wear of the disc brake rotors 290 is detected, a signal is delivered from the controller 142 to the solenoid of the pressure control valve 238 and the pressure control valve 238 shifts to an open position. The controller 142 instructs the motor 250 via a travel sensor (not shown) that is connected to the brake pedal 210 to control the output volume of the pump 252 to the brake valve 236 and calipers 285. The output volume of the pump 252 may be determined as noted above in step 304. Pressurized hydraulic fluid may flow through fluid lines 242, 244, 246, 248 to brake assemblies 112, 114, 116, 118, The pressurized hydraulic fluid delivered by the open pressure control valve 238 passes through brake valve 236 hydraulic accumulator 240 to open the brake valve 236 and allow for modulation of the pressurized hydraulic fluid flow to the calipers 285 (not shown) of the brake assemblies 112, 114, 116, 118.

In another exemplary embodiment, when circumferential wear of the disc brake rotors 290 of the brake assemblies 112, 114, 116, 118 is not detected by the controller 142, a signal may be transmitted from the controller 142 to the solenoid of the pressure control valve 238 to close the pressure control valve 238.

In another exemplary embodiment, in an ABS system 140, the valves 224, 226 may be opened or closed to allow a predetermined volume (determined in step 402) of pressurized hydraulic fluid to flow through the fluid lines 242, 244, 246, 248 to the calipers 285. In an ABS system, accumulators, such as accumulator 240, are sized so that if normally closed valves leak, the master cylinder 136 has sufficient volume to fill the accumulator 240 with pressurized hydraulic fluid and still develop enough pressure in the brake assemblies 112, 114, 116, 118 for significant deceleration of the vehicle 102. The ability of the pressurized hydraulic fluid to move in and out of the orifices in solenoids of the brake valves 224, 226, 236 is regulated by an inlet valve of the pump 252 or added check valve to ensure that pressure drop from the brake assemblies 112, 114, 116, 118 to the pump 252 inlet is greater than one atmosphere, or approximately 14.7 PSI or 1.01 Bar.

In another exemplary embodiment, the valves 224, 226, 236, 238 of the electro-hydraulic braking system 200 may be used to redirect pressurized hydraulic fluid from the front axle 128 to the rear axle 132 or from the rear axle 132 to the front axle 128 to mitigate the effects of brake torque variation. For example, the controller 142 may detect increased brake torque variation in the front axle 128. As the vehicle 102 decelerates, the controller 142 may transfer brake torque variation due to circumferential wear on the disc brake rotors 290 of the front brake assemblies 112, 114 from the front axle 128 to the rear axle 132 to balance the brake torque variation. Alternatively, variations in brake torque may be mitigated at each wheel 104, 106, 108, 110 in a similar manner.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, those of ordinary skill in the art would understand that the present teachings as disclosed would work equally well for any type of vehicle having a braking system that utilizes brake rotors.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A method for cancelling brake torque variation, comprising:
   controlling, via a controller, an antilock brake system ("ABS") brake pedal valve fluidly coupled to a reservoir, the ABS brake pedal valve controlling delivery of pressurized brake fluid from a master cylinder to brake calipers;
   receiving, at the controller, signals indicative of brake torque variation;
   determining, based on the signals, a frequency of the brake torque variation;
   bypassing, via the controller, control of the ABS brake pedal valve, by controlling, via the controller, a brake valve and a pump motor; and
   in response to controlling the brake valve and pump motor, calculating an output volume of pressurized fluid to be applied to calipers of the brake system, and reducing the brake torque variation by delivering the calculated output volume of pressurized brake fluid from an accumulator fluidly coupled to a pump and the brake valve to the calipers of the brake system by controlling the pump motor based on the frequency.

2. The method of claim 1, further comprising identifying a pattern of axial thickness on disc brake rotor causing the brake torque variation.

3. The method of claim 1, further comprising increasing the output volume of the pressurized brake fluid as a thin portion of a disc brake rotor passes through the calipers.

4. The method of claim 3, further comprising decreasing the output volume of the pressurized brake fluid as a thick portion of the disc brake rotor passes through the calipers.

5. The method of claim 3, wherein the frequency and phase of the brake torque variation is detected using a tuned resonator whose resonant frequency is based on vehicle speed.

6. The method of claim 1, further comprising compensating for brake torque variation at each wheel of a motor vehicle.

7. The method of claim 1, wherein delivering pressurized brake fluid to calipers of the brake system by controlling the pump motor based on the frequency comprises opening, via the controller, the brake valve and a pressure control valve to direct pressurized brake fluid to the accumulator.

8. The method of claim 1, wherein delivering pressurized brake fluid to the calipers by controlling a pump motor based on the frequency comprises adjusting at least one of an output time and output volume of pressurized brake fluid directed from the pump to the calipers.

9. The method of claim 1, wherein delivering pressurized brake fluid to the calipers by controlling the pump motor based on the frequency cancels the brake torque variation.

10. The method of claim 1, wherein delivering pressurized brake fluid to the calipers by controlling the pump motor based on the frequency reduces a variation in a clamping force applied to a rotor of the brake system via the calipers.

11. A system for cancelling brake torque variation, comprising:
   a master cylinder;
   a pump;
   a motor configured to drive the pump;
   an accumulator fluidly coupled to the pump;
   a brake valve disposed between and in fluid connection with the master cylinder and the accumulator;
   antilock brake system ("ABS") brake pedal valves coupled to and in fluid communication with the master cylinder and a reservoir; and
   a controller configured to:
      receive signals indicative of brake torque variation;
      determine, based on the signals, a frequency and a phase associated with the indicated brake torque variation;
      calculate an output volume of pressurized fluid to be applied to calipers;
      control the motor based on at least one of the frequency and the phase to deliver the calculated output volume of pressurized brake fluid from the accumulator to the calipers via the pump to move brake pads into contact with a disc brake rotor, thereby bypassing ABS brake pedal valves control of pressurized brake fluid from the master cylinder and reducing the brake torque variation.

12. The system of claim 11, wherein the controller is further configured to identify a pattern of axial wear on the disc brake rotor causing the brake torque variation.

13. The system of claim 11, wherein the output volume of the pressurized brake fluid is increased when a thin portion of the disc brake rotor passes through the calipers.

14. The system of claim 13, wherein the output volume of the pressurized brake fluid is decreased when a thick portion of the disc brake rotor passes through the calipers.

15. The system of claim 11, wherein brake torque variation is mitigated at each wheel of a motor vehicle.

16. The system of claim 11, wherein the accumulator and brake valve are configured to hydraulically isolate the pump from the master cylinder.

17. The system of claim 11, wherein delivering pressurized brake fluid by controlling a pump motor based on the frequency comprises adjusting at least one of an output time and output volume of pressurized brake fluid directed from a pump to calipers.

18. The system of claim 11, wherein delivering pressurized brake fluid by controlling a pump motor based on the frequency comprises canceling the brake torque variation.

19. A method for cancelling brake torque variation in a brake system, the method comprising:
   controlling the brake system via an antilock brake system ("ABS") brake pedal valve fluidly coupled to a reservoir;
   receiving, at a controller, signals indicative of brake torque variation;
   determining, based on the signals, a frequency of the brake torque variation;
   calculating an output volume of pressurized fluid to be applied to calipers causing brake pads to apply a clamping force on a rotor of the brake system; and
   reducing the brake torque variation by delivering the calculated volume of pressurized brake fluid from an accumulator fluidly coupled to a pump and the brake valve to the calipers of the brake system, while bypassing the ABS brake pedal valve control of the brake system via the controller by opening a brake valve and controlling a pump motor, based on the frequency.

20. The method of claim 19, wherein controlling a hydraulic fluid volume includes adding fluid to or releasing fluid from the calipers based on the frequency.

* * * * *